UNITED STATES PATENT OFFICE.

THOMAS LEOPOLD WILLSON AND MAXIMILIAN MATTHEUS HAFF, OF OTTAWA, ONTARIO, CANADA, ASSIGNORS, BY DIRECT AND MESNE ASSIGNMENTS, TO SOUTHERN INVESTMENT CO. OF CANADA LTD., OF MONTREAL, CANADA, A CORPORATION OF CANADA.

METHOD OF DRYING SUPERPHOSPHATES AND THE LIKE.

1,122,183. Specification of Letters Patent. Patented Dec. 22, 1914.

No Drawing. Application filed August 17, 1912. Serial No. 715,571.

*To all whom it may concern:*

Be it known that we, THOMAS LEOPOLD WILLSON and MAXIMILIAN MATTHEUS HAFF, both subjects of the King of Great Britain, and residents of the city of Ottawa, Province of Ontario, Dominion of Canada, have invented certain new and useful Improvements in Methods of Drying Superphosphates and the like, of which the following is the specification.

This invention relates to a method of drying superphosphates of calcium, and particularly such as contain an excess of acid, and the objects are to provide a simple and economical method by means of which the phosphate may be changed from a more or less pasty condition to a dry powdered condition without affecting its solubility, and may at the same time be combined with nitrogen to render it more valuable as a fertilizer.

Ordinary monocalcic phosphate contains from 14 to 15% phosphoric acid and is in a comparatively dry state and suitable for use as a fertilizer. It is prepared usually by the addition of sulfuric acid to a natural phosphate rock.

According to the present invention, ammonia preferably in the form of dry gas, is introduced into the damp or pasty mass of the phosphate. The function of the ammonia is twofold. In the first place it combines with the phosphate to produce an ammonium calcium phosphate compound as hereinafter described, thereby increasing the fertilizing properties of the compound; and in the second place the heat liberated by its reaction with the monocalcic phosphate dries the mass and expels any uncombined moisture. In practising the invention we have found that a small amount, say 10 to 15% of ammonia as vapor, is sufficient, the excess amount varying according to the amount of free phosphoric acid ($P_2O_5$), the ammonia forming ammonium calcium phosphate, ammonium phosphate and ammonium sulfate. The 10 to 15% of ammonia is of course more than sufficient to neutralize the free acid in the mixture so that the final product will have no free acid but will have increased quantities of ammonia combined therein.

It will be seen that the fact that the reaction of the reagent ammonia with the compound monocalcic phosphate is exothermic, causes any uncombined moisture in the mass to be expelled, thereby producing a commercially dry salt more adaptable for use as a fertilizer than the original moist or damp monocalcic phosphate. In addition to this a desirable quantity of nitrogen is introduced into the compound which increases its fertilizing value. The ammonium compound produced does not injuriously affect the solubility of the compound, as after treatment, it will still be found to be soluble in the standard ammonium citrate solution. It would appear that the method herein described of drying a fertilizing compound, and at the same time increasing its fertilizing value by the addition of nitrogen might be applied to other fertilizing compounds, provided that the reagents used do not produce any compounds which are undesirable for fertilizing purposes.

The compound ammonium monocalcic phosphate appears to be new. From the nature of its constituents, it forms a very valuable fertilizer. In physical form it is white, dry and crystalline. On heating, ammonia is liberated.

It will be apparent that the ammonia will convert the free phosphoric acid ($P_2O_5$) into ammonium phosphate and this will also be present in the resultant compound of the final mass. In the case of superphosphates made in the ordinary way from sulfuric acid, the use of an excess of this acid would result in a product probably containing both free sulfuric and phosphoric acids which would be neutralized by the ammonia during the drying operation. It may be stated that where phosphoric acid ($P_2O_5$) is referred to herein it may be used in the commercial form of liquid phosphoric acid.

What we claim as our invention is:

1. The herein described process which comprises first adding sulfuric acid to natural phosphate rock to produce superphosphate, then introducing ammonia gas into the superphosphate in quantities greater than would be sufficient to only neutralize the free acid therein to thereby form ammonium monocalcic phosphate and ammonium sulfate.

2. As a new article of manufacture, a substantially dry fertilizer composition containing ammonium monocalcic phosphate, a little ammonium sulfate and containing no free acid.

3. As a new article of manufacture, a dry fertilizer containing ammonium calcium phosphate, such phosphate containing at least sufficient ammonia to correspond to the formula $Ca(NH_4)H_3(PO_4)_2$ and ammonium sulfate.

In witness whereof we have hereunto set our hands in the presence of two witnesses.

THOMAS LEOPOLD WILLSON.
MAXIMILIAN MATTHEUS HAFF.

Witnesses:
RUSSEL S. SMART,
PEARLE M. GARRAN.